United States Patent
Bloebaum (10) Patent No.: US 7,856,249 B2
(45) Date of Patent: Dec. 21, 2010

(54) COMBINED MASS STORAGE AND SUBSCRIBER IDENTITY MODULE PROVIDING INFORMATION SECURITY AND APPARATUS FOR USE THEREWITH

(75) Inventor: Leland Scott Bloebaum, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 847 days.

(21) Appl. No.: 11/695,288

(22) Filed: Apr. 2, 2007

(65) Prior Publication Data

US 2007/0171601 A1 Jul. 26, 2007

Related U.S. Application Data

(63) Continuation-in-part of application No. 10/983,800, filed on Nov. 8, 2004, now abandoned.

(51) Int. Cl.
*H04B 1/38* (2006.01)

(52) U.S. Cl. .................. 455/558; 455/410; 455/557; 455/556.1; 235/441; 235/492

(58) Field of Classification Search .............. 455/558, 455/418, 412.1, 412.2, 420, 41.1, 514, 186.1, 455/557, 410, 556.1; 439/152, 76.1; 361/685; 235/375, 380, 487, 492, 441, 439; 713/193, 713/185
See application file for complete search history.

(56) References Cited

U.S. PATENT DOCUMENTS 6,092,133 A * 7/2000 Erola et al. ................ 710/301
6,945,454 B2 * 9/2005 Tournemille et al. ........ 235/375
7,107,455 B1 * 9/2006 Merkin ...................... 713/182
2002/0076954 A1 * 6/2002 Chen et al. ................ 439/76.1
2004/0082210 A1 * 4/2004 Wallace et al. .............. 439/152
2004/0164170 A1 * 8/2004 Krygier et al. .............. 235/492
2004/0211835 A1 * 10/2004 Tournemille et al. ........ 235/441
2005/0109841 A1 5/2005 Ryan et al. .................. 235/380
2005/0257073 A1 * 11/2005 Bade et al. .................. 713/193

(Continued)

FOREIGN PATENT DOCUMENTS

EP  1189465  * 9/2000

(Continued)

OTHER PUBLICATIONS

International Search Report, PCT/US2005/020135, Oct. 11, 2005.

(Continued)

*Primary Examiner*—Tan Trinh
(74) *Attorney, Agent, or Firm*—Myers Bigel Sibley & Sajovec, P.A.

(57) ABSTRACT

A mass storage and subscriber identity module includes a frame and a mass storage device supported by the frame. The module also include a first connector supported by the frame and configured to be removably connected to a smart card and a second connector supported by the frame, electrically coupled to the mass storage device and the first connector, and configured to be removably connected to an electronic device. The module further includes an interface circuit configured to control access via the second connector to information stored in the mass storage device based on information in a smart card, e.g., a SIM card, connected to the first connector.

20 Claims, 9 Drawing Sheets

U.S. PATENT DOCUMENTS

| | | | |
|---|---|---|---|
| 2005/0278257 A1* | 12/2005 | Barr et al. | 705/57 |
| 2005/0288056 A1 | 12/2005 | Bajikar et al. | 455/554.2 |
| 2006/0061953 A1* | 3/2006 | Le | 361/684 |
| 2006/0098405 A1* | 5/2006 | Bloebaum | 361/685 |
| 2007/0083772 A1* | 4/2007 | Harada et al. | 713/193 |

FOREIGN PATENT DOCUMENTS

| | | |
|---|---|---|
| EP | 1 189 465 A1 | 3/2002 |
| WO | WO 2005/026923 * | 3/2004 |
| WO | WO2005/026923 | 3/2005 |

OTHER PUBLICATIONS

Samsung's Digital World—Press Release, "Samsung Electronics Unveils the First Mobile Phone with Hard Drive," http://www.Samsung.com/PressCenter/PressRelease/PressRelease.asp?seq=20040907-000 . . . , Printed Sep. 16, 2004.

* cited by examiner

COMBINED MASS STORAGE AND SUBSCRIBER IDENTITY MODULE PROVIDING INFORMATION SECURITY AND APPARATUS FOR USE THEREWITH

RELATED APPLICATION

The present application is a continuation-in-part of U.S. patent application Ser. No. 10/983,800, filed Nov. 8, 2004 now abandoned and hereby incorporated by reference in its entirety.

BACKGROUND OF THE INVENTION

The present invention relates to electronic devices and accessories therefor, and more particularly, to peripheral modules for use with electronic devices, such as wireless handsets, personal digital assistants, gaming devices, and laptop computers.

Consumer electronics devices, such as laptop computers, notebook computers, pocket PCs, personal digital assistants (PDAs), gaming devices, and the like, now commonly possess wireless communications capabilities. For example, many laptop and notebook computers now incorporate radio communications circuitry configured to communicate with, for example, wireless local area (e.g., WiFi) networks. Devices, such as PDAs and laptops, may also be configured, e.g., through use of special-purpose cards, to communicate with public cellular (e.g., GSM or IS-95CDMA) networks. An example of a GSM-compatible wireless card for use with a laptop computer is the GC-82 cellular PC card produced by SonyEricsson Mobile Communications AB.

Some portable electronic devices now use mass storage devices to hold large amounts of data, such as video and music files. For example, some portable music players, such as the iPod®, include an internal hard disk drive (HDD), and a wireless phone with an HDD has been recently introduced by Samsung Electronics. Advanced mobile phones and other wireless devices (e.g., wireless PDAs) are increasingly incorporating significant digital media capabilities, e.g., digital still cameras, video recorders, audio recorders, etc., so it is likely that mass storage capability will become even more desirable. It is known to connectorize small HDDs, such as those used in portable music players, so that they can be removed and plugged into compatible connectors on other devices, e.g., a mass storage reader on a desktop or laptop computer. This can allow for transfer of data (e.g., MP3 files) to or from the HDD. This portability also can allow a user to migrate content between devices, e.g., between a portable music player and home stereo system.

SUMMARY OF THE INVENTION

According to some embodiments of the present invention, a mass storage and subscriber identity module includes a frame and a mass storage device supported by the frame. The module also includes a first connector supported by the frame and configured to be removably connected to a smart card and a second connector supported by the frame, electrically coupled to the mass storage device and the first connector, and configured to be removably connected to an electronic device. The module further includes an interface circuit configured to control access via the second connector to information stored in the mass storage device based on information in a smart card, e.g., a SIM card, connected to the first connector.

In some embodiments, the interface circuit is further configured to receive information via the second connector, to encrypt the received information responsive to information received via the first connector, and to store the encrypted received information in the mass storage device. The interface circuit may be configured to retrieve information from the mass storage device, to decrypt the retrieved information based on information received via the first connector and to communicate via the second connector responsive to the decryption of the retrieved information. The interface circuit may be configured to transmit the decrypted retrieved information via the second connector. In some embodiments, the interface circuit may be configured to detect a failure to successfully decrypt the retrieved information and to responsively transmit an error message via the second connector. The interface circuit may be further configured to provide access via the second connector to information in a smart card connected to the first connector.

In further embodiments of the present invention, an electronic device configured for use with a subscriber identity and mass storage module includes a connector configured to be removably connected to a connector of the subscriber identity and mass storage module and an interface circuit configured to receive first information from a mass storage device of the subscriber identity and mass storage module, to receive second information from a smart card coupled to the subscriber identity and mass storage module and to decrypt the first information based on the second information. The interface circuit may be further configured to encrypt third information according to the second information and to transfer the encrypted third information to the subscriber identity and mass storage module for storage therein.

Some embodiments of the present invention provide methods wherein a smart card is coupled to a removable mass storage and subscriber identity module. The removable mass storage and subscriber identity module is coupled to an electronic device. First information stored in the mass storage and subscriber identity module is accessed from the electronic device responsive to second information stored in the smart card. Accessing first information stored in the mass storage and subscriber identity module from the electronic device responsive to second information stored in the smart card may include decrypting the first information based on the second information at the mass storage and subscriber identity module and transferring the decrypted first information to the electronic device. Methods may further include detecting a failure to successfully decrypt the first information at the mass storage and subscriber identity module and responsively transmitting an error message from the mass storage and subscriber identity module to the electronic device. Accessing first information stored in the mass storage and subscriber identity module from the electronic device responsive to second information stored in the smart card may include transferring the first information and the second information from the mass storage and subscriber identity module to the electronic device and decrypting the first information based on the second information at the electronic device.

Methods may further include transferring third information from the electronic device to the mass storage and subscriber identity module and storing the third information in a mass storage device of the mass storage and subscriber identity module based on the second information. Storing the third information in a mass storage device of the mass storage and subscriber identity module based on the second information may include encrypting the third information based on the second information.

DETAILED DESCRIPTION OF EXEMPLARY EMBODIMENTS

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some embodiments of the present invention arise from a realization that performance for wireless devices, such as wireless handsets and wireless-enabled PDAs and computers, may be enhanced by combining portable mass storage, such as may be provided with a connectorized HDD, with subscriber identity functionality that is typically desired for the wireless environment. In some embodiments of the present invention, this enhanced capability can be provided by a mass storage and subscriber identity module that is configured to be removably connected to an electronic device, such as a wireless handset or wireless-enabled computer. Subscriber identity capability may be integrated into such a module or, according to additional aspects of the present invention, subscriber identity functions may be provided by a mass storage and subscriber identity module that is configured to be connected to a smart card (e.g., a GSM SIM card) that performs subscriber identity functions. The subscriber identify functionality may also be used to support access control for information stored in the module, e.g., by using the smart card information for encryption and decryption of the stored information.

Figure 1:
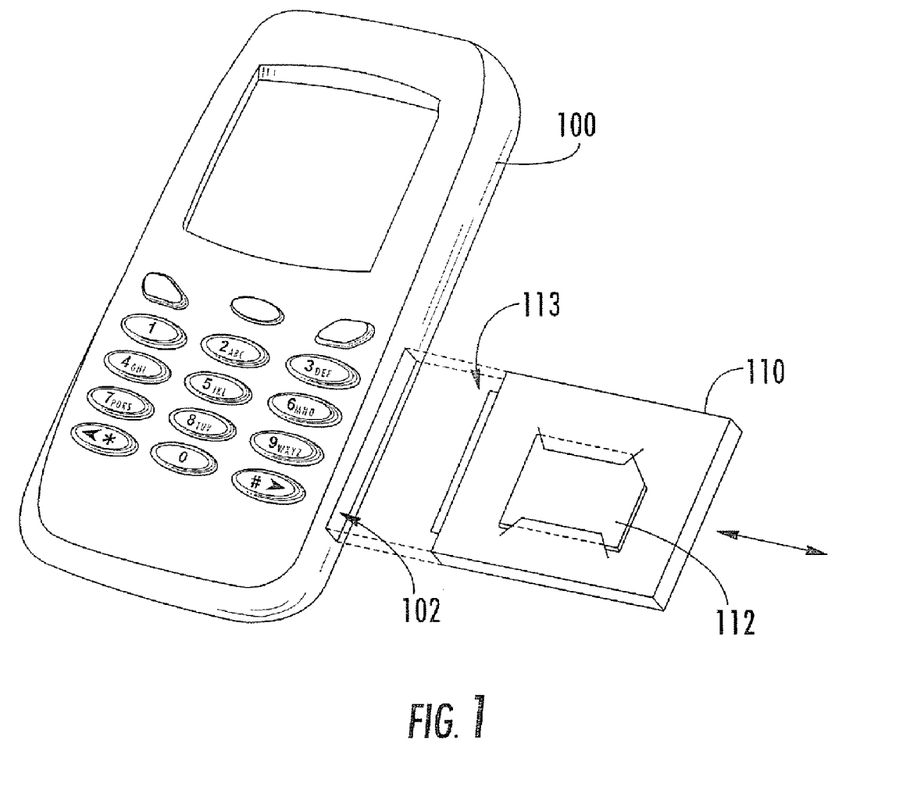
FIG. 1 illustrates removable mass storage and subscriber identity module employed with a wireless handset according to some embodiments of the present invention.

Referring to FIG. 1, in some embodiments of the present invention, an electronic device, in particular, a wireless handset 100, may be configured to connect to a removable mass storage and subscriber identity module 110 that performs mass storage and subscriber identity functions. In the illustrated embodiments, the module 110 is configured to connect to a smart card 112, e.g., a GSM SIM card, that is configured to support the subscriber identity function performed by the module 110. As shown, the module 110 is configured for insertion in a bay (slot) 102, such that a connector 113 of the module 110 engages a mating connector (not shown) within the handset 100. Although the smart card 112 is shown as being retained in a clip-like assembly on the module 110, it will be appreciated that, in various embodiments of the present invention, a mass storage and subscriber identity module could be configured to receive a smart card in a slot, opening, or other retaining structure that facilitates electrical connection and mechanical attachment of the smart card to the module.

Figure 2:
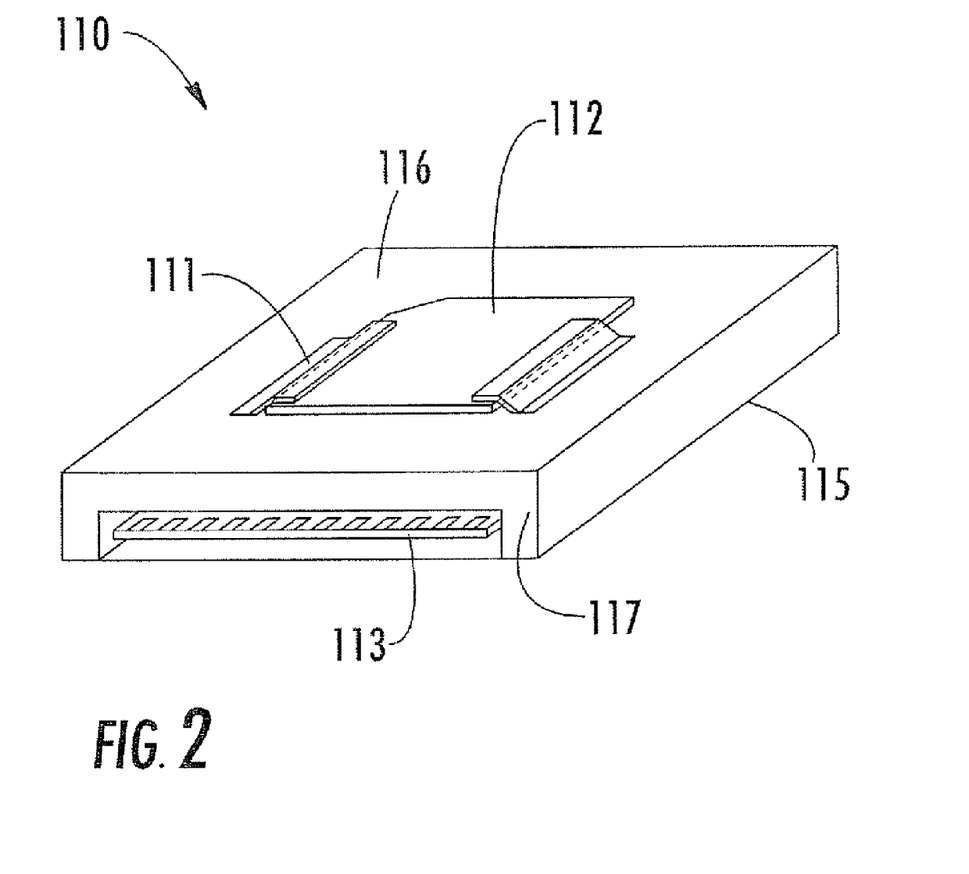
FIGS. 2 and 3 illustrate the removable mass storage and subscriber identity module of FIG. 1 with and without a smart card installed, respectively.
Figure 3:
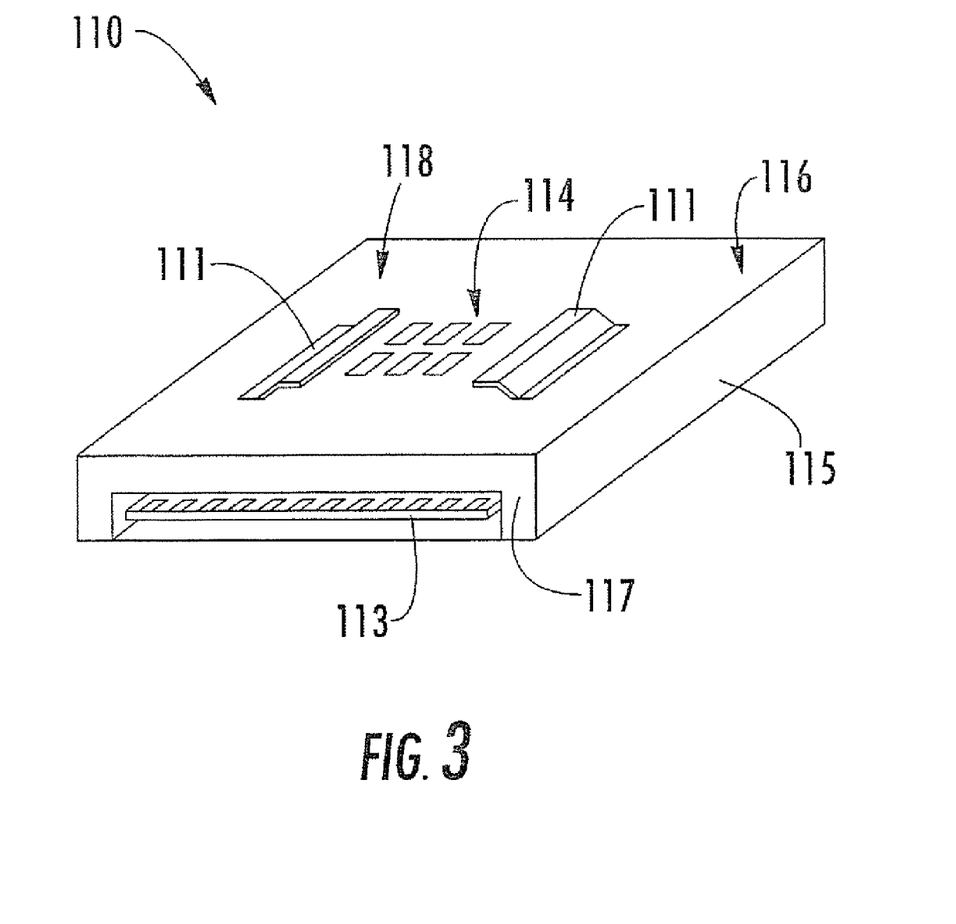

FIGS. 2-3 are views that illustrate additional features of the mass storage and subscriber identity module 110, with and without installation of the smart card 112. The module 110 includes a frame, in particular, a housing 115, that supports a mass storage device, such as one including a magnetic storage medium (e.g., an HDD), an optical storage medium (e.g., an optical disk drive) and/or a semiconductor storage medium (e.g., flash memory). The housing 115 also supports a card edge connector 113 that is disposed at an edge side 117 of the housing 115 and that is configured to mate with a matching connector in an electronic device, such as the handset 100 of FIG. 1. The housing 115 further supports a second connector 118, here shown as including a plurality of contacts 114 disposed on a major side 116 of the housing 115 and a clip or sleeve 111 that is configured to electrically connect to and retain the smart card 112. In particular, the clip 111 is configured to hold the smart card 112 against the major side 116 of the housing 115 such that the contacts 114 are held in contact with mating contacts (not shown) of the smart card 112. It will be appreciated that any of a wide variety of mechanical structures other than those shown in FIGS. 1-3 may be used to contact and retain a smart card in various other embodiments of the present invention.

Figure 4:
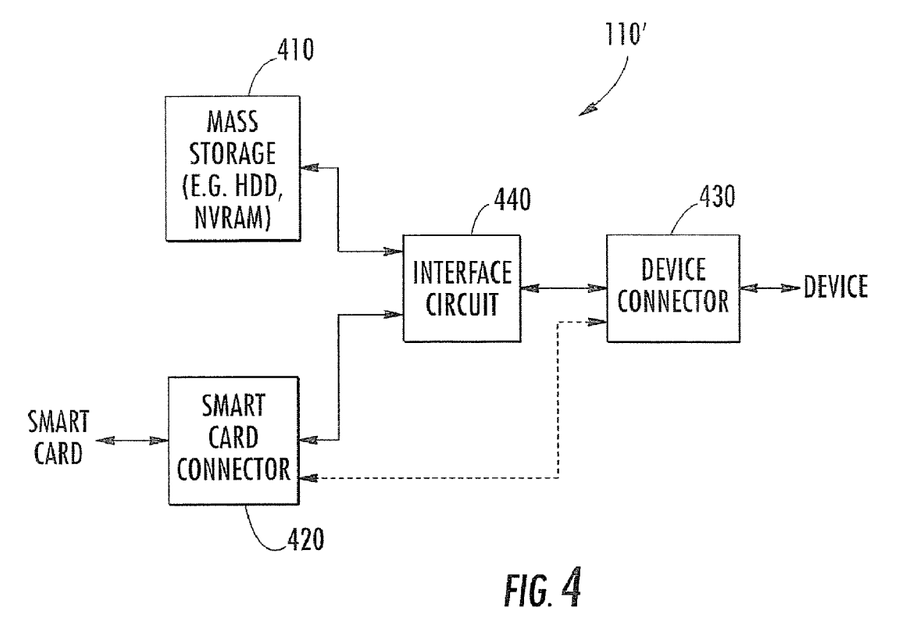
FIG. 4 is a block diagram illustrating a mass storage and subscriber identity module according to further embodiments of the present invention.

FIG. 4 illustrates an exemplary arrangement of components in a mass storage and subscriber identity module according to further embodiments of the present invention. A mass storage and subscriber identity module 110' includes a mass storage device 410, such as a magnetic storage medium (e.g., an HDD), an optical storage medium (e.g., an optical disk drive) and/or a semiconductor storage medium (e.g., flash memory). The module 110' further includes an interface circuit 440 that supports communication with the mass storage device 410 from a device connector 430, e.g., a connector configured to engage a mating connector in an electronic device, such as a wireless handset, PDA, laptop computer, or the like. It will be understood that the device connector may take any of a number of different forms, including, for example, a card-type connector as shown in FIGS. 1-3, or a cable-type connector, such as a Universal Serial Bus (USB) connector. The interface circuit 440 may include, for example, buffering, cache, signal processing and/or other circuitry that supports data transfer to and/or from the mass storage device 410.

A smart card connector 420, i.e., a connector configured to engage contacts on a smart card, is also electrically coupled to the device connector 430. As shown in dashed line, this connection may be direct, e.g., pins of the smart card connector 420 may be directly wired to pins of the device connector 430. Alternatively, the smart card connector 420 may be coupled to the device connector 430 via the interface circuit 440, which may, for example, provide buffering of smart card signals.

Figure 5:
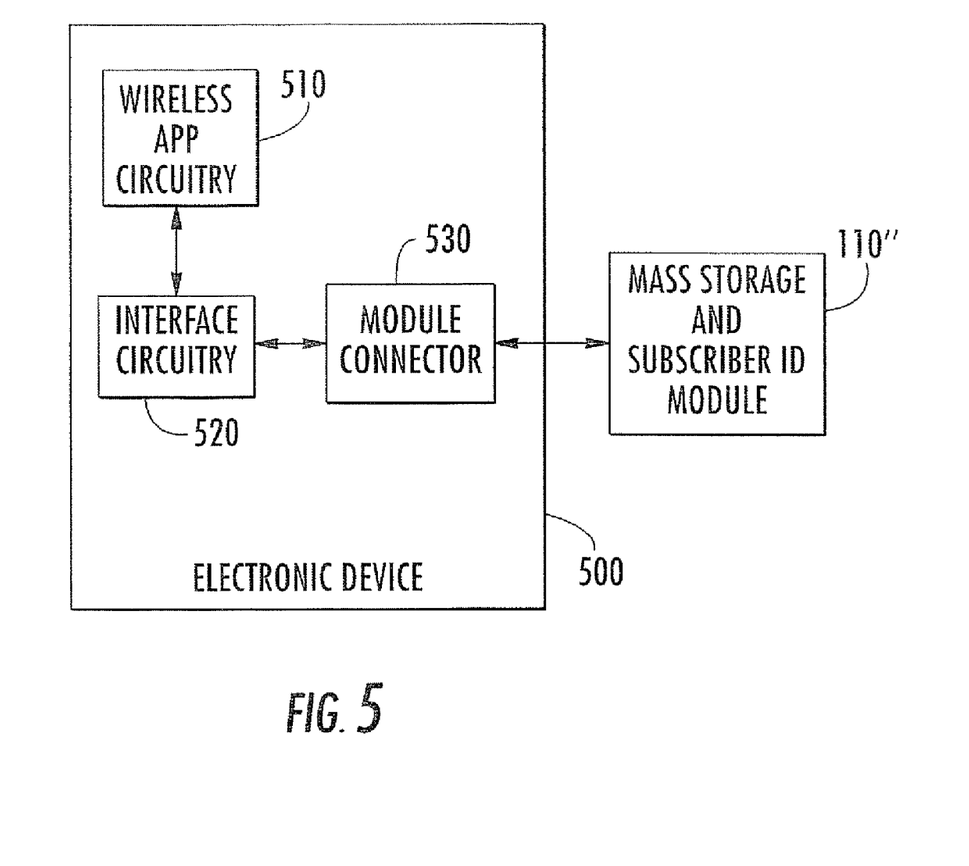
FIG. 5 is a block diagram illustrating an electronic device configured for use with a mass storage and subscriber identity module according to some embodiments of the present invention.

FIG. 5 illustrates an electronic device 500 configured to utilize a mass storage and subscriber identity module according to further embodiments of the present invention. As shown, the device 500, which may be, for example, a wireless handset, wireless-enabled computer or other device, includes wireless applications circuitry 510. The wireless applications circuitry 510 may include, for example, a radio transceiver, microprocessor, memory and other circuitry needed to support wireless applications for the device 500. The device 500 further includes interface circuitry 520 that is configured to communicate with the wireless applications circuitry 510 and to communicate with a removable mass storage and subscriber identity module 110" via a module connector 530 such that, for example, data may be exchanged between the wireless applications circuitry 510 and mass storage (e.g., an HDD) in the module 110" and subscriber identity functions may be performed by the wireless applications circuitry 510 in conjunction with complementary circuitry (e.g., a smart card) of the module 110". Such subscriber identity functions, such as user validation and other security functions, are known to those skilled in the art, and will not be discussed in further detail.

Figure 6:
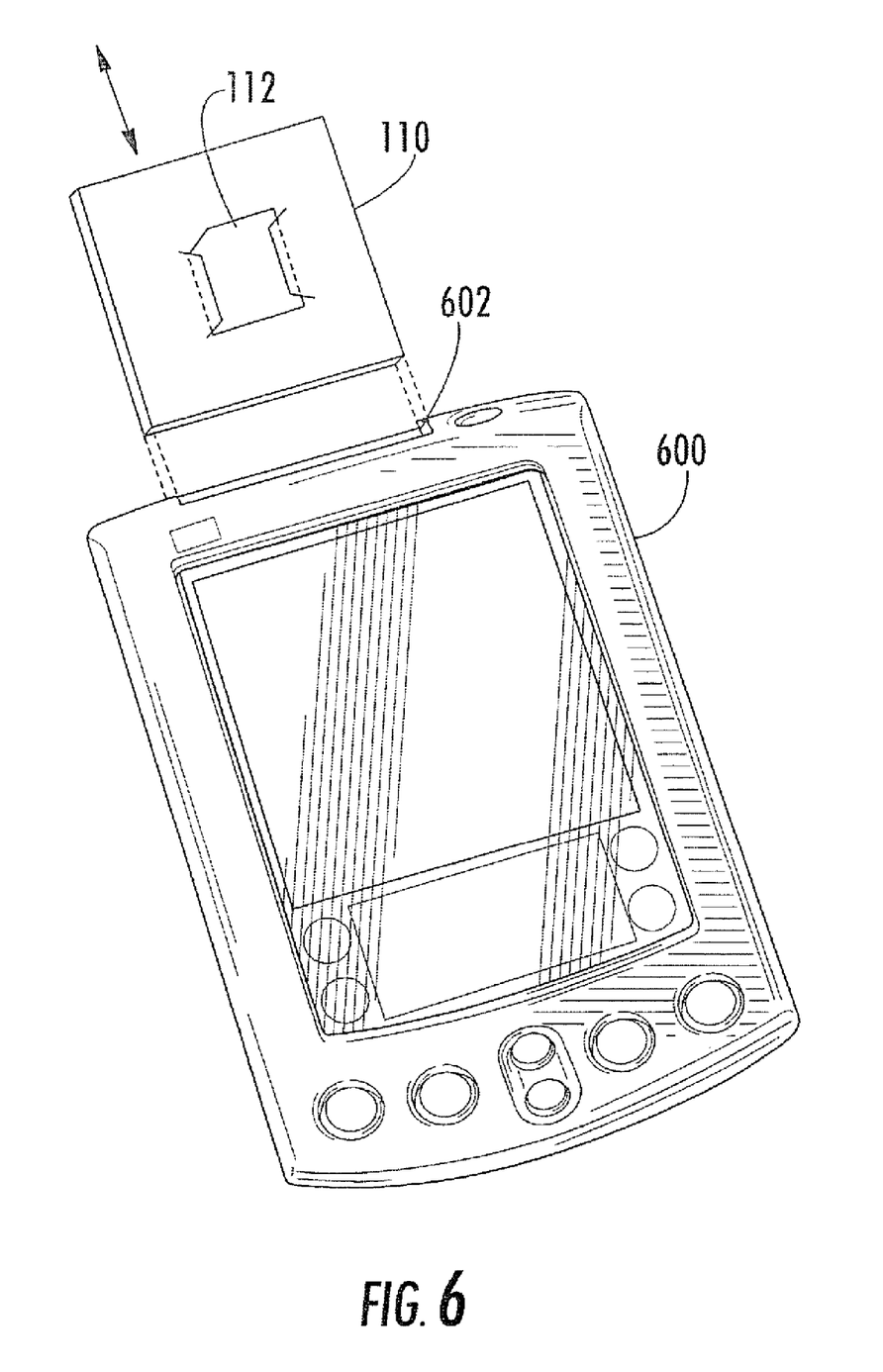
FIGS. 6 and 7 illustrate the removable mass storage and subscriber identity module of FIG. 1 employed with a PDA and a laptop computer, respectively, according to further embodiments of the present invention.
Figure 7:
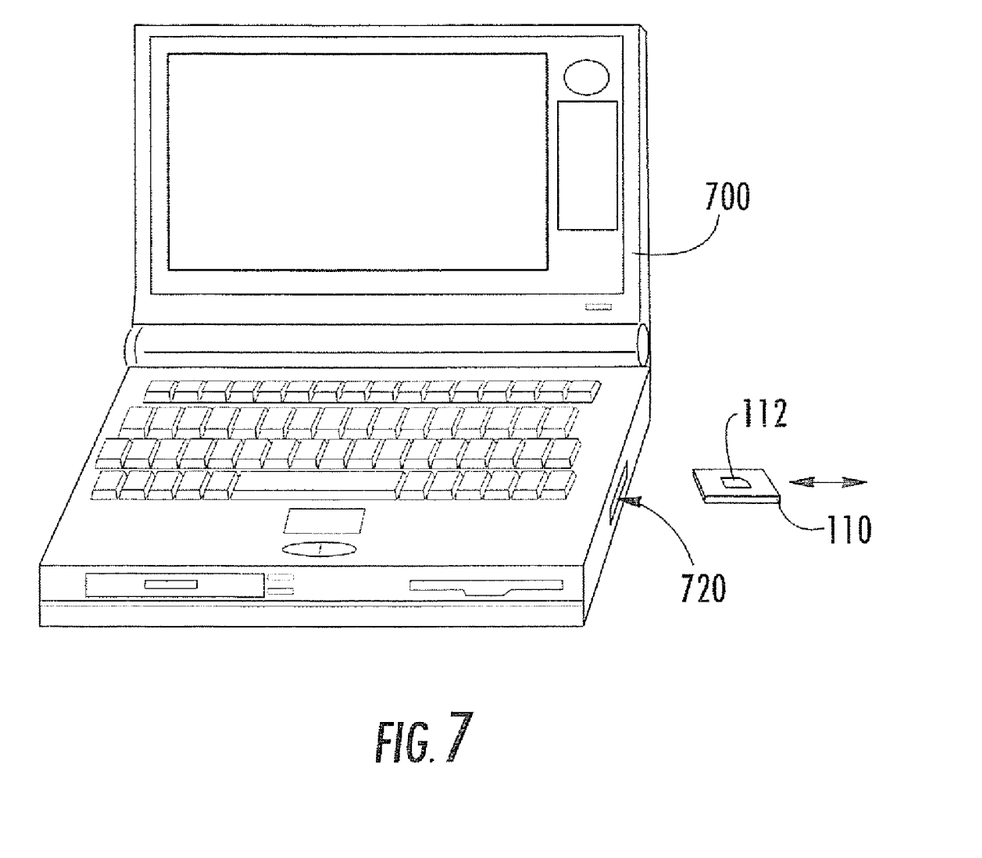

FIGS. 6 and 7, in conjunction with FIG. 1, illustrate potential advantages that may be provided by mass storage and subscriber identity modules according to some embodiments of the present invention. In particular, the mass storage and subscriber identity module 100 of FIGS. 1-3 may be compatible with a range of devices other than the wireless handset 100 shown in FIG. 1. For example, FIG. 6 shows a PDA 500 having a slot 602 configured to receive the module 110, while FIG. 7 shows a laptop computer 700 have a similar slot 702. It will be further appreciated that other compatible devices, such as gaming devices, may be similarly configured within the scope of the present invention. As will be appreciated, such arrangements enable, for example, transfer of audio and/or video files among such devices, along with subscriber identity information stored in the smart card 112 of the module 110. Thus, a user may be enabled to more easily move both personal content and service subscription between devices. This may become particularly desirable as more devices become wireless enabled.

Figure 8:
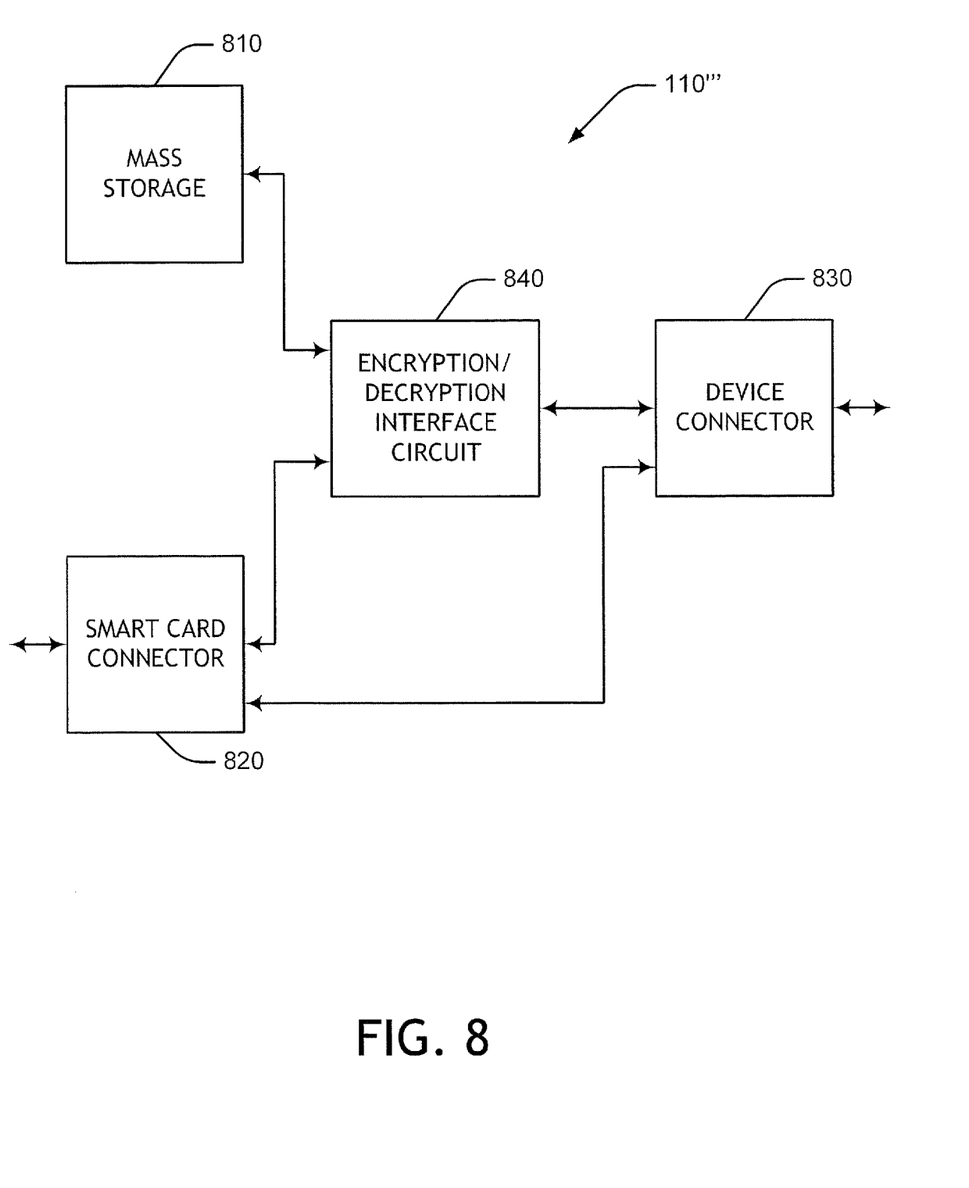
FIG. 8 is a block diagram illustrating a mass storage and subscriber identity module providing access control according to further embodiments of the present invention.

According to additional embodiments of the present invention, information stored in a smart card, such as a SIM, may be used to control access to information stored in a mass storage and subscriber identity module along the lines above. For example, FIG. 8 illustrates a mass storage and subscriber identity module 110''' that includes a mass storage device 810, such as a magnetic storage medium (e.g., an HDD), an optical storage medium (e.g., an optical disk drive) and/or a semiconductor storage medium (e.g., flash memory). The module 110''' further includes an encryption/decryption interface circuit 840 that supports communication with the mass storage device 810 from a device connector 830, e.g., a connector configured to engage a mating connector in an electronic device, such as a wireless handset, PDA, laptop computer, or the like. It will be understood that the device connector may take any of a number of different forms, including, for example, a card-type connector as shown in FIGS. 1-3, or a cable-type connector, such as a Universal Serial Bus (USB) connector. A smart card connector 820, i.e., a connector configured to engage contacts on a smart card, is also electrically coupled to the device connector 830. Identity information stored in the smart card may be transferred directly to a device connected to the device connector 830, e.g., pins of the smart card connector 820 may be directly wired to pins of the device connector 830, or may be transferred via the encryption/decryption interface circuit 840.

In the illustrated embodiments, the encryption/decryption interface circuit 840 is configured to provide access control by encryption of information received via the device connector 830 according to information, such as identifiers and/or encryption keys, received from the smart card connected to the smart card connector 820. The encryption/decryption interface circuit 840 may store the encrypted information at the mass storage device 810, such that access to the stored information may be prevented in the absence of the smart card used to encrypt the information. For example, to transfer the stored information to a device coupled to the device connector 830, the encryption/decryption interface circuit 840 may retrieve encrypted information from the mass storage device 810, decrypt it according to encryption information retrieved from the smart card connected to the smart card connector 820, and transmit the decrypted information to the device connected to the device connector 830. If an inappropriate smart card is present or no smart card is connected, the encryption/decryption interface circuit 840 may, for example, detect a failure to properly decrypt the information (e.g., using a checksum or other verification technique) and send an error message to the device connected to the device connector 830. Alternatively, the encryption/decryption interface circuit 840 may simply transfer inaccurately decrypted information to the connected device, which may be unable to decipher it.

Figure 9:
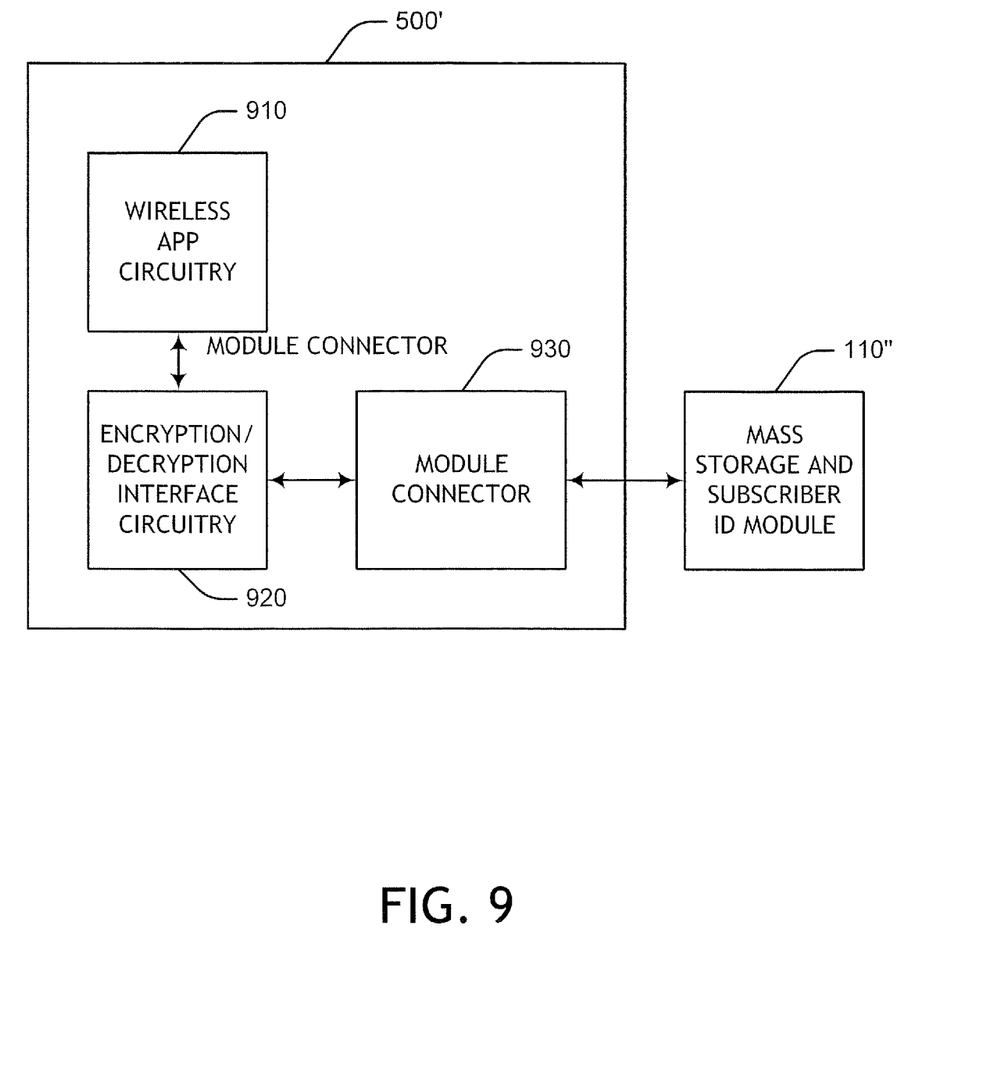
FIG. 9 is a block diagram illustrating an electronic device configured for use with a mass storage and subscriber identity module and supporting access control according to some embodiments of the present invention.

According to further embodiments of the present invention, similar access control operations may be implemented in the connected device, rather than in the mass storage and subscriber identity module. Referring to FIG. 9, an electronic device 900 according to some embodiments of the present invention includes wireless applications circuitry 910. The wireless applications circuitry 910 may include, for example, a radio transceiver, microprocessor, memory and other circuitry needed to support wireless applications for the device 900. The device 900 further includes encryption/decryption interface circuitry 920 that is configured to communicate with the wireless applications circuitry 910 and to communicate with a removable mass storage and subscriber identity module 110" via a module connector 930. In particular, the encryption/decryption interface circuitry 920 may be configured to retrieve encryption information (e.g., identifiers, keys) from a smart card connected to the module 110", to encrypt information received from the wireless applications circuitry 910 according to the encryption information, and to transfer the encrypted information to the module 110" for storage.

The encryption/decryption interface circuitry 920 may retrieve such stored information in a similar manner. In particular, the encryption/decryption interface circuitry 920 may retrieve encrypted information stored in the module 110" along with encryption information from a smart card connected to the module 110", and may decrypt the encrypted information based on the encryption information retrieved from the smart card. Information retrieved from the smart card may also be used for other purposes, such as supporting security functions associated with wireless communications (e.g., network access), without any decryption/encryption operations on information stored in the module 110".

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A mass storage and subscriber identity module comprising:
    a frame;
    a mass storage device supported by the frame;
    a first connector supported by the frame and configured to be removably connected to a smart card;
    a second connector supported by the frame, electrically coupled to the mass storage device and the first connector, and configured to be removably connected to an electronic device; and
    an interface circuit configured to control access via the second connector to information stored in the mass storage device based on information in a smart card connected to the first connector.

2. The module of claim 1, wherein the interface circuit is further configured to receive information via the second connector, to encrypt the received information responsive to information received via the first connector, and to store the encrypted received information in the mass storage device.

3. The module of claim 2, wherein the interface circuit is configured to retrieve information from the mass storage device, to decrypt the retrieved information based on information received via the first connector and to communicate via the second connector responsive to the decryption of the retrieved information.

4. The module of claim 3, wherein the interface circuit is configured to transmit the decrypted retrieved information via the second connector.

5. The module of claim 3, wherein the interface circuit is configured to detect a failure to successfully decrypt the retrieved information and to responsively transmit an error message via the second connector.

6. The module of claim 1, wherein the interface circuit is further configured to provide access via the second connector to information in a smart card connected to the first connector.

7. The module of claim 1:
    wherein the first connector is configured to be supported by the frame, electrically coupled to a SIM card; and
    wherein the interface circuit is configured to control access via the second connector to information stored in the mass storage device based on information in SIM card connected to the first connector.

8. An electronic device configured to be removably connected to and to interoperate with the module of claim 1.

9. An electronic device for use with a subscriber identity and mass storage module, comprising:
    a connector configured to be removably connected to a connector of the subscriber identity and mass storage module; and
    an interface circuit configured to receive first information from a mass storage device of the subscriber identity and mass storage module, to receive second information from a smart card coupled to the subscriber identity and mass storage module and to decrypt the first information based on the second information.

10. The device of claim 9, wherein the interface circuit is further configured to encrypt third information according to the second information and to transfer the encrypted third information to the subscriber identity and mass storage module for storage therein.

11. The device of claim 9, wherein the smart card comprises a SIM card.

12. A method comprising:
    coupling a smart card to a removable mass storage and subscriber identity module;
    coupling the removable mass storage and subscriber identity module to an electronic device; and
    accessing first information stored in the mass storage and subscriber identity module from the electronic device based on second information stored in the smart card.

13. The method of claim 12, wherein accessing first information stored in the mass storage and subscriber identity module from the electronic device based on second information stored in the smart card comprises decrypting the first information based on the second information at the mass storage and subscriber identity module and transferring the decrypted first information to the electronic device.

14. The method of claim 13, further comprising detecting a failure to successfully decrypt the first information at the mass storage and subscriber identity module and responsively transmitting an error message from the mass storage and subscriber identity module to the electronic device.

15. The method of claim 12, wherein accessing first information stored in the mass storage and subscriber identity module from the electronic device based on second information stored in the smart card comprises transferring the first information and the second information from the mass storage and subscriber identity module to the electronic device and decrypting the first information based on the second information at the electronic device.

16. The method of claim 12, further comprising transferring third information from the electronic device to the mass storage and subscriber identity module and storing the third information in a mass storage device of the mass storage and subscriber identity module based on the second information.

17. The method of claim 16, wherein storing the third information in a mass storage device of the mass storage and subscriber identity module based on the second information comprises encrypting the third information based on the second information.

18. The method of claim 17, wherein encrypting the third information based on the second information occurs in the mass storage and subscriber identity module.

19. The method of claim 17, wherein encrypting the third information based on the second information occurs in the electronic device.

20. The method of claim 12, wherein the smart card comprises a SIM card.

* * * * *